Feb. 2, 1926.
W. E. MENZIES
1,571,909
REGULATOR SYSTEM
Original Filed July 13, 1922
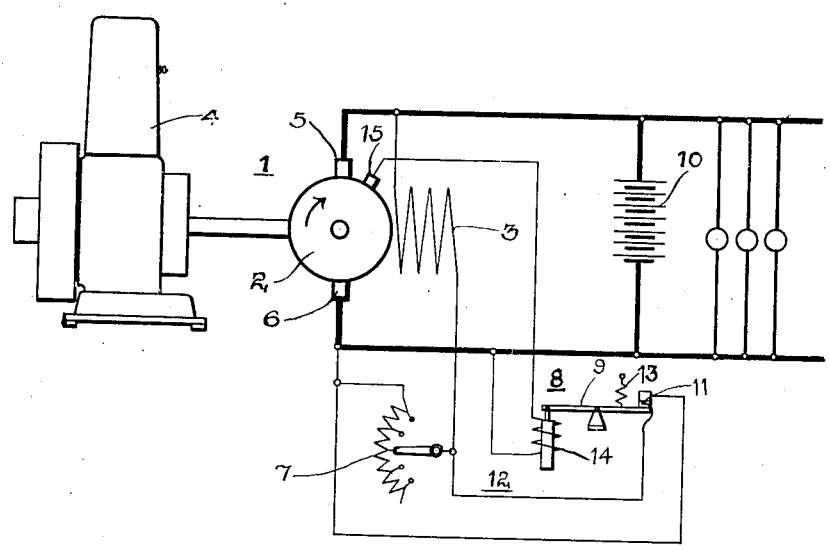
WITNESSES:
C. N. Cochran
W. R. Coley
INVENTOR
William E. Menzies.
BY
Wesley G. Carr
ATTORNEY Patented Feb. 2, 1926.

1,571,909

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed July 13, 1922, Serial No. 574,736. Renewed January 7, 1926.

*To all whom it may concern:*

Be it known that I, WILLIAM E. MENZIES, a citizen of the United States, and a resident of Irwin, in the county of Westmoreland and State of Pennsylvania, have invented a new and useful Improvement in Regulator Systems, of which the following is a specification.

My invention relates to regulator systems and it has special relation to systems of voltage regulation.

The primary object of my invention is to provide a system of the above-indicated character that shall be responsive to a characteristic other than the full voltage of the controlled machine and that shall govern the excitation of the same to improve the voltage characteristics thereof commensurate with variations in the load circuit.

My invention is illustrated as applied to a generator adapted to charge a storage battery and also to supply a lighting circuit. In charging a storage battery, the voltage of the load circuit is raised proportionally to the state of charge of the battery. That is to say, when the battery is discharged, the voltage thereof may be, for example, substantially 36 volts, whereas, when the battery is fully charged, the voltage thereof is substantially 42 volts. This increase in voltage of the load circuit affects the voltage delivered by the generator by reason of the effect of armature reaction on the field-magnet winding flux.

Thus, in order to improve the voltage regulation upon the load circuit so that there may be no perceptible effect upon the lighting circuit, I propose to connect the coil of a vibratory voltage regulator to one of the main brushes and to a third brush bearing upon the commutator cylinder of the armature and so located that the effect of armature reaction is to decrease the voltage on the regulator coil as the armature current decreases. This regulator controls a rheostat located in the circuit of the field-magnet winding of the generator.

My invention will be best understood from the accompanying drawing, wherein the single figure is a diagrammatic illustration of circuits and apparatus constituting one embodiment of my invention.

A generator 1, which comprises an armature 2 and a shunt field-magnet winding 3, is adapted to be operated by a prime mover 4, here conventionally shown as an internal-combustion engine. The armature 2 has co-operating therewith a pair of main brushes 5 and 6 to which the load circuit is connected, and the direction of rotation of the armature is indicated by the arrow. Herein the load circuit is illustrated as including a storage battery 10 and a lighting circuit.

The field-magnet winding 3 has in circuit therewith a rheostat 7, which is adapted to be periodically short-circuited by the operation of a regulator 8, comprising a pivoted lever 9, a pair of co-operating contact members 11 located near one end thereof and a control electromagnet 12 that is pivotally connected near the other end of the lever 9. There is also a spring 13 co-operating with the lever 9 and located on the opposite side of the pivotal point from the electromagnet 12, to oppose the action thereof.

The electromagnet 12 has a coil 14 that is energized from a third brush 15, which co-operates with the generator armature 2, and one main brush 6. It will be noted that the third brush is so located that the current therethrough is decreased proportional to the reaction occurring by reason of a decrease in armature current.

It has been heretofore pointed out that, as the battery 10 becomes charged, there is a decrease in the current traversing the armature circuit, whereby the effect of armature reaction in the generator is also decreased. By suitably proportioning the regulator, the resultant current of lower value in the coil 14 decreases the pull of the electromagnet 12, thereby enabling the spring 13 to close the contact members 11 to short-circuit the rheostat 7 in the field-magnet winding circuit. The field of the generator being increased, there is an increased voltage delivered by the generator to the load circuit. Since the regulator 8 is of the vibratory type, the effect of decreasing the energization of the electromagnet 12 is to increase the average length of time the rheostat 7 is excluded from the field-magnet winding circuit.

The advantage of the present system is that close regulation is obtained upon the load circuit of a generator adapted to charge a storage battery; particularly in cases where the battery is adapted to have a tapering charge. That is to say, a six-volt increase in the armature-circuit potential between discharged condition and condition of full charge, as assumed in the previous example, would be perceptible in the illumination of the lamps fed from the charging generator. As the voltage of the armature circuit increases because of the increased charge in the battery, the armature reaction so affects the current induced beneath the third brush 15 as to cause the regulator to increase the strength of the field-magnet winding of the generator. Furthermore, the tapering charge decreases the current delivered by the generator, consequently increasing the effect upon the regulator and rendering the same more sensitive.

It is to be noted that the voltage of the generator is not necessarily maintained constant, it is merely maintained proportional to the increased state of charge of the battery and, therefore, the tapering charge of the battery is in no way affected. The proportioning of the regulator is such that sufficiently close voltage regulation is maintained upon the generator 1 to preclude any perceptible change in the illumination of the lamp load by reason of variations in the state of charge of the battery.

It may be desirable, with certain types of regulators, to so proportion the regulator that the opposite effect may be obtained upon the generator; or the auxiliary brush 15 may be so placed as to receive current that is strengthened by the effect of armature reaction.

Modifications in the system and arrangement and location of parts may be made within the spirit and scope of my invention, and such modifications are intended to be covered by the appended claims.

I claim as my invention:—

1. In a system of regulation, the combination with a generator having an armature, a plurality of brushes therefor, and a field-magnet winding, of a regulator for governing the excitation of said generator, said regulator being responsive to current derived from said generator through one of the brushes co-operating with said armature, said brush being so located as to receive current that decreases with a decrease in armature current.

2. In a system of regulation, the combination with a generator having an armature, main and auxiliary brushes co-operating therewith and a field-magnet winding, and a rheostat in circuit with said field-magnet winding, of a regulator adapted to control a shunt circuit for said rheostat, said regulator comprising a pivoted lever, contact members controlled thereby, and an electromagnet having a coil that is energized from said auxiliary brush and one of said main brushes.

3. In a system of regulation, the combination with a generator having an armature, main and auxiliary brushes co-operating therewith and a field-magnet winding, and a rheostat in circuit with said field-magnet winding, of a regulator adapted to control a shunt circuit for said rheostat, said regulator comprising a pivoted lever, contact members controlled thereby, and an electromagnet having a coil that is energized from said auxiliary brush and one of said main brushes, said auxiliary brush being so located that the current taken thereby is decreased with a decrease in the armature current.

4. In a system of voltage regulation, the combination with a generator having an armature, main and auxiliary brushes co-operating therewith and a field-magnet winding, a rheostat in circuit with said field-magnet winding and a load circuit for said generator comprising a storage battery and a lighting circuit, of a regulator adapted to control said rheostat, said regulator comprising an electromagnet having a coil that is energized from said auxiliary brush and one of said main brushes so that the current therein decreases when the current in said load circuit decreases.

5. In a system of voltage regulation, the combination with a generator having an armature, main and auxiliary brushes co-operating therewith and a load circuit connected to said generator, of a regulator adapted to govern the excitation of said generator, said regulator being energized from said auxiliary brush and one of said main brushes so as to increase the generated voltage with a decrease in load upon the generator.

In testimony whereof, I have hereunto subscribed my name this 8th day of July, 1922.

WILLIAM E. MENZIES.